_United States Patent_ [19]

Rauterkus et al.

[11] 3,870,673

[45] Mar. 11, 1975

[54] PROCESS FOR THE PREPARATION OF POLYMER DISPERSIONS OF A VINYL ESTER-ETHYLENE-AN ACRYLAMIDE BEING FREE FROM EMULSIFIERS

[75] Inventors: Karl Josef Rauterkus, Kelkheim/Taunus; Jan Blazek, Bad Soden/Taunus, both of Germany

[73] Assignee: Hoechst Aktiengesellschaft, Frankfurt/Main, Germany

[22] Filed: Jan. 17, 1973

[21] Appl. No.: 324,412

[30] Foreign Application Priority Data
Jan. 18, 1972 Germany............................ 2202189

[52] U.S. Cl.................... 260/29.6 A, 117/161 UT, 260/29 UA, 260/29.4 UA, 260/29.6 RW, 260/73 R, 260/80.73
[51] Int. Cl. ........................................... C08f 45/24
[58] Field of Search ......... 260/29.6 TA, 29.6 RW, 260/29.6 RB, 260/80.73, 29.6 T, 29.6 PM

[56] References Cited
UNITED STATES PATENTS

| | | | |
|---|---|---|---|
| 3,265,654 | 8/1966 | Glabisch et al.............. | 260/29.6 TA |
| 3,365,409 | 1/1968 | Lanthier..................... | 260/29.6 RW |
| 3,632,787 | 1/1972 | Wilbur........................ | 260/29.6 RB |
| 3,644,262 | 2/1972 | Stehle et al................. | 260/29.6 RW |
| 3,770,680 | 11/1973 | Iacoviello.................... | 260/29.6 TA |
| 3,795,648 | 3/1974 | Samour et al.............. | 260/29.6 HN |

_Primary Examiner_—Lucille M. Phynes
_Attorney, Agent, or Firm_—Curtis, Morris & Safford

[57] ABSTRACT

A process for the preparation of polymer dispersions being free from emulsifiers is provided in which a vinyl ester, ethylene and an acrylamide component are polymerized in aqueous dispersion in the presence of a radical-forming catalyst.

3 Claims, No Drawings

PROCESS FOR THE PREPARATION OF POLYMER DISPERSIONS OF A VINYL ESTER-ETHYLENE-AN ACRYLAMIDE BEING FREE FROM EMULSIFIERS

The present invention relates to a process for the preparation of stable dispersions being free from emulsifiers and made from vinyl esters, ethylene and an acrylamide component.

Generally, polymer dispersions are prepared with addition of emulsifiers or protective colloids. The amount of emulsifier or protective colloid may be up to 10 weight % and more, based on the weight of the polymer. A large amount of hydrophilic, non-polymerizable substances, however, causes the polymer films obtained from these dispersions to be very sensitive to water, so that they may even be re-emulsified, which adversely affects the different technological properties to a great extent. A further drawback of emulsifier containing dispersions is the considerable tendency to foaming which is very often observed. It is possible to reduce substantially the amount of emulsifier present during the polymarization, but this adversely affects the stability of the dispersion. Another method for the preparation of dispersionns free from emulsifiers is described for example in German Offenlegungsschriften Nos. 1,720,593 and 1,769,349; in these cases, the stability of the dispersions is achieved by polymerization incorporation of αβ-ethylenically unsaturated carboxylic acids or the salts thereof. However, the fact of a solids content of only about 30 weight % in these dispersions proves that the stabilizing effect of such substances is insufficient to obtain high precentage dispersions having a solids content of 50 weight % and more.

A process has not been found for the preparation of polymer dispersions being free from emulsifiers and made from at least one vinyl ester, ethylene and at least one further ethylenically unsaturated monomer, which comprises employing an acrylamide component of the formula

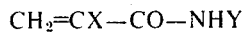

$$CH_2=CX-CO-NHY$$

where X is hydrogen or a methyl group, Y is hydrogen or the group $-CH_2-O-Z$, and Z is hydrogen or an alkyl or acyl radical having up to four carbon atoms, as the other ethylenically unsaturated monomer, and starting the polymerization by means of a redox initiator system from an organic peroxide or hydroperoxide and a watersoluble reducing agent.

The process is generally carried out as follows: From 0 to 20 weight %, preferably from 10 to 15 weight %, of the vinyl ester, from 0 to 20 weight % of the acrylamide component, from 30 to 90 weight % of the water required for the preparation of the dispersion, and from 10 to 25 weight % of the peroxide catalyst are introduced into the reactor. The reactor is then pressurized with ethylene, while stirring, until the necessary pressure is attained, and the mixture is heated to the reaction temperature. The ethylene pressure depends on the desired degree of softness and flexibility of the dispersion films, and is generally from about 10 to 100 atmospheres, preferably from 20 to 45 atmospheres. The reaction temperature depends on the redox initiator system used, which must have a sufficiently high decomposition rate constant at this temperature, and it is generally from about 40° to 100° C, preferably from 50° to 80° C. Subsequently, the remaining vinyl ester containing the remaining peroxide, the remainder of the acrylamide component in the form of an aqueous solution, and the aqueous solution of the reducing agent and a buffer salt for adjusting the pH value are added simultaneously in the course of several hours. A determined pH range of from about 3 to 7, preferably from 5 to 7, for the polymerization, which range should not be exceeded, prevents hydrolysis of the vinyl ester and the acrylamide component, which would hydrolize in a strongly acidic as well as in an alkaline medium. As vinyl esters, the vinyl esters of saturated aliphatic monocarboxylic acids having up to 18 carbon atoms may be used, preferably the esters of lower monocarboxylic acids having up to four carbon atoms, especially vinyl acetate. The amount of the acrylamide componnent is from about 2 to 15 weight %, based on the weight of the vinyl ester.

Suitable peroxide catalysts are the organic peroxides or hydroperoxides usually employed, preferably the latter, especially cumene hydroperoxide or t-butyl hydroperoxide. As activator or reducing component of the initiator system, watersoluble reducing agents, for example sodium hydrogen sulfite, sodium disulfite or sodium formaldhyde-sulfoxylate may be used. The amount of peroxide catalyst and activator each is from about 0.2 to 2 weight %, based on the weight of the vinyl ester.

Suitable buffer salts for adjusting the pH value to about 3 to 7 are the phosphates or borates usually employed for this pH range, for example sodium pyrophosphate, disodium hydrogen phosphate or borax, and the amounts are from about 0.1 to 0.6 weight %, based on the weight of the dispersion.

In the process of this invention, there are surprisingly obtained stable polymer dispersions free from coagulum having high polymer contents of up to 65 weight %, without using any emulsifier. The dispersions are of a fine particle size and, after drying, form a clear film without fish eyes. Depending on the ethylene content, they have a minimum film-forming temperature of from about 0° to 5° C. These dispersions are suitable as binders for non-woven fabrics, as vehicles in dispersion paints and paper coatings, for the manufacture of adhesives and glues, for use in the building materials field, as pigment binders for pigment printing, and for textile finishing.

The reactive groups present in the polymer chain permit cross-linking of the polymers by addition of suitable substances, for example aldehydes, such as formaldehyde or glyoxal, melamineformaldehyde or urea-formaldehyde precondensates, or by the action of acids, thus substantially increasing the resistance of these dispersion films against water and solvents.

The following examples illustrate the invention.

EXAMPLE I

A 30 liter polymerization pressure autocclave containing a heating and a cooling jacket, an anchor agitator, and three feeder pumps for liquids is carefully evacuated and alternately flushed with nitrogen. Subsequently, a starting emulsion is introduced, containing 4,000 g of water, 600 g of vinyl acetate and 10 g of t-butyl hydroperoxide. This starting batch is heated to 80° C with agitation. Maintaining the temperature, the autoclave is pressurized with 30 atmospheres of ethylene, and subsequently, the following solutions are added simultaneously by means of the pumps:

a. a solution of 30 g of t-butyl hydroperoxide in 7,160 g of vinyl acetate
b. a solution of 600 g of acrylamide in 1,400 g of water
c. a solution of 40 g of sodium pyrophosphate and 40 g of sodium disulfite in 2,000 g of water.

Solutions (a) and (b) are added within 4 hours, solution (c) is added within 4 hours and 10 minutes. The ethylene pressure and the temperature are maintained constant during the reaction. After addition of solution (c), the batch is maintained at the reaction temperature for another hour. Subsequently, the dispersion in the vessel is cooled slowly to room temperature and discharged via the bottom valve.

Properties of the dispersion:

| | |
|---|---|
| Polymer content | 54.1 weight % |
| viscosity (at 20°C) | 1.95 poises |
| pH value | 5.8 |
| minimum film-forming temperature | 0°C |

EXAMPLE 2

After previous evacuation, a 10 l pressure autoclave containing the same devices as described in Example 1 is charged with a starting emulsion of 1,330 g of water, 200 g of vinyl acetate, 20 g of acrylamide and 3.3 g of t-butyl hydroperoxide. The autoclave is pressurized with about 7 atmospheres of ethylene with agitation, and the liquid is heated to a temperature of 60° C, at which temperature the reactor is pressurized with further ethylene until the total pressure amounts to 30 atmospheres. Subsequently, the following solutions are added simultaneously:
a. 2,390 g of vinyl acetate with 10 g of t-butyl hydroperoxide dissolved therein
b. 280 g of acrylamide in 450 g of water
c. 13.3 g of sodium disulfite and 13.3 g of sodium pyrophosphate in 670 g of water.

Solutions (a) and (b) are added within 4 hours, solution (c) is added within 4 hours and 20 minutes. Temperature and pressure are maintained constant. After addition of solution (c), the reaction mixture is heated to 75° C for another hour, subsequently cooled, and the dispersion is discharged.

Properties of the dispersion:

| | |
|---|---|
| Polymer content | 52.9 weight % |
| viscosity (at 20°C) | 5.12 poises |
| pH value | 5.3 |
| minimum film-forming temperature | 0°C |

EXAMPLE 3

A mixture of 4,000 g of water, 600 g of vinyl acetate and 10 g of t-butyl hydroperoxide is charged to a 30 l pressure autoclave (as described in Example 1). The mixture is heated to the desired reaction temperature of 70° C by means of the heating jacket, and at this temperature, the reactor is pressurized with 45 atmospheres of ethylene. Temperature and pressure are maintained constant while subsequently there are added simultaneously within 6 hours:
a. 7,160 g of vinyl acetate and 30 g of t-butyl hydroperoxide dissolved therein b. 2,000 g of water, 900 g of acrylamide and 300 g of N-methylol-acrylamide
c. 40 g of sodium pyrophosphate, 80 g of sodium disulfite and 1,400 g of water.

After addition of solutions (a), (b) and (c), 15.6 g of ammonium persulfate in 100 g of water and 15.6 g of thiourea dioxide in 500 g of water are added separately. After 30 minutes, the temperature inside the reactor is raised to 80° C, and the reaction is continued for another hour at this temperature. After cooling, the dispersion is discharged.

Properties of the dispersion:

| | |
|---|---|
| Polymer content | 56.4 weight % |
| viscosity (at 20°C) | 6.9 poises |
| pH value | 5.4 |
| minimum film-forming temperature | 0°C |

EXAMPLE 4

A polymerization is carried out as described in Example 3, with the exception that one third of the amount of acrylamide necessary for the preparation of the dispersion is replaced my methacrylamide.

The dispersion is free from grit and has a polymer content of 53.1 weight %. The viscosity is 4.3 poises at 20° C and pH value 5.6. The minimum film-forming temperature is 0° C.

EXAMPLE 5

The procedure is the same as described in Example 1, but the temperature is 70° C, the ethylene pressure 45 atmospheres, the composition of solution (a) is 1,200 g of acrylamide and 1,400 g of water, that of solution (c) 40 g of sodium pyrophosphate, 80 g of sodium disulfite and 1,500 g of water, and the time of addition is 6 hours.

Properties of the dispersion:

| | |
|---|---|
| Polymer content | 62.7 weight % |
| viscosity (at 20°C) | 287 poises |
| pH value | 5.3 |
| minimum film-forming temperature | 0°C |

What is claimed is:
1. An aqueous polymer dispersion being free from emulsifiers and having a polymer content of from 40 to 65% by weight, said polymer consisting essentially of units of at least one vinyl ester of a saturated aliphatic monocarboxylic acid having from one to 18 carbon atoms, ethylene, and from 2 to 15% by weight, based on said vinyl ester, at least one acrylamide component of the formula

$$CH_2=CX-CO-NHY$$

wherein X is hydrogen or a methyl group, Y is hydrogen or the group $-CH_2-O-Z$, and Z is hydrogen or an alkyl or acyl group having up to four carbon atoms, said ethylene derived units in said polymer being in an amount polymerizable with said vinyl ester and said acrylamide at a pressure from 10 to 100 atmospheres.

2. A process for the preparation of an aqueous polymer dispersion as claimed in claim 1 which comprises polymerizing the monomers at a pressure of from 10 to 100 atmospheres and a temperature from 40° to 100° C in the presence of a redox initiator system comprising an organic peroxide or hydroperoxide and a water-soluble reducing agent.

3. An aqueous polymer dispersion being free from emulsifiers made from at least one vinyl ester of a saturated aliphatic monocarboxylic acid having from one to eighteen carbon atoms, ethylene and wherein the polymer contains 2 to 15% by weight based on said vinyl ester an acrylamide component of the formula $$CH_2=CX-CO-NHY$$

wherein X is hydrogren or a methyl group, Y is hydrogen or the group $-CH_2-O-Z$, and Z is hydrogen or an alkyl or acyl radical having up to four carbon atoms, the ethylene derived units being in an amount polymerizable with said vinyl ester and said acrylamide at a pressure from 10 to 100 atmospheres, and the dispersion has a polymer content of from 40 to 65 weight percent.

* * * * *